United States Patent [19]
Weyrick et al.

[11] 3,849,886
[45] Nov. 26, 1974

[54] TAPE MEASURE

[76] Inventors: Nola D. Weyrick; Thora Weyrick, both of 2317 Fairdale Ave., Cleveland, Ohio 44109

[22] Filed: Jan. 12, 1973

[21] Appl. No.: 322,947

[52] U.S. Cl. ............................................. 33/2 R
[51] Int. Cl. ............................................. A41h 1/02
[58] Field of Search.... 33/2 R, 11, 12, 17 R, 137 R, 33/137 L

[56] References Cited
UNITED STATES PATENTS

| | | | |
|---|---|---|---|
| 376,558 | 1/1888 | Stahl | 33/2 R X |
| 460,282 | 9/1891 | Smith | 33/2 R |
| 650,136 | 5/1900 | Runnette | 33/137 R |
| 719,924 | 2/1903 | Westcott | 33/2 R |
| 736,052 | 8/1903 | Adamson | 33/2 R |
| 899,802 | 9/1908 | Pohle | 33/2 R |
| 1,784,888 | 12/1930 | Couture | 33/2 R |
| 3,685,155 | 8/1972 | Oblander | 33/11 |

Primary Examiner—Louis R. Prince
Assistant Examiner—Charles E. Phillips
Attorney, Agent, or Firm—Donnelly, Maky, Renner & Otto

[57] ABSTRACT

A tape measure for measuring and recording the dimensions of a person's body to facilitate the tailoring of a correctly fitting garment for that person, said tape measure having pin means at one end by which the tape measure may be suspended from the middle of the shoulder down the front and back with measurements to the bust, waist, hip, etc. lines being recorded by identifying markers detachably secured on the tape measure, said tape measure having hook means at its other end which cooperate with longitudinally spaced apart apertures in the tape measure to facilitate the making of circumference measurements around the bust, waist, hips, thighs, etc. with identifying markers detachably secured to the tape measure corresponding to the respective apertures in which said hook means is engaged. With the tape measure having the various identifying markers secured thereto, the measurements are then transferred to the pattern and to the fabric for cutting and sewing to make the finished garment to accurately fit the shape of that person's body.

5 Claims, 6 Drawing Figures

PATENTED NOV 26 1974  3,849,886
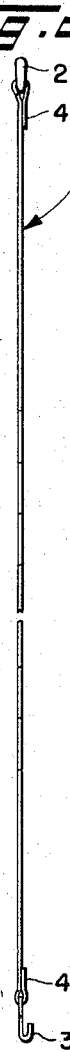
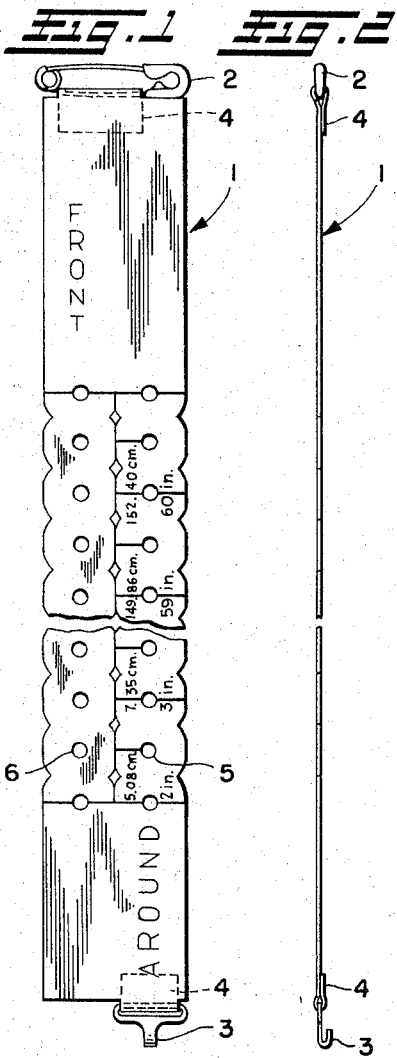
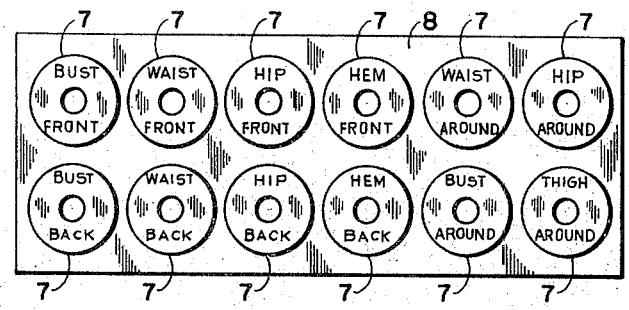
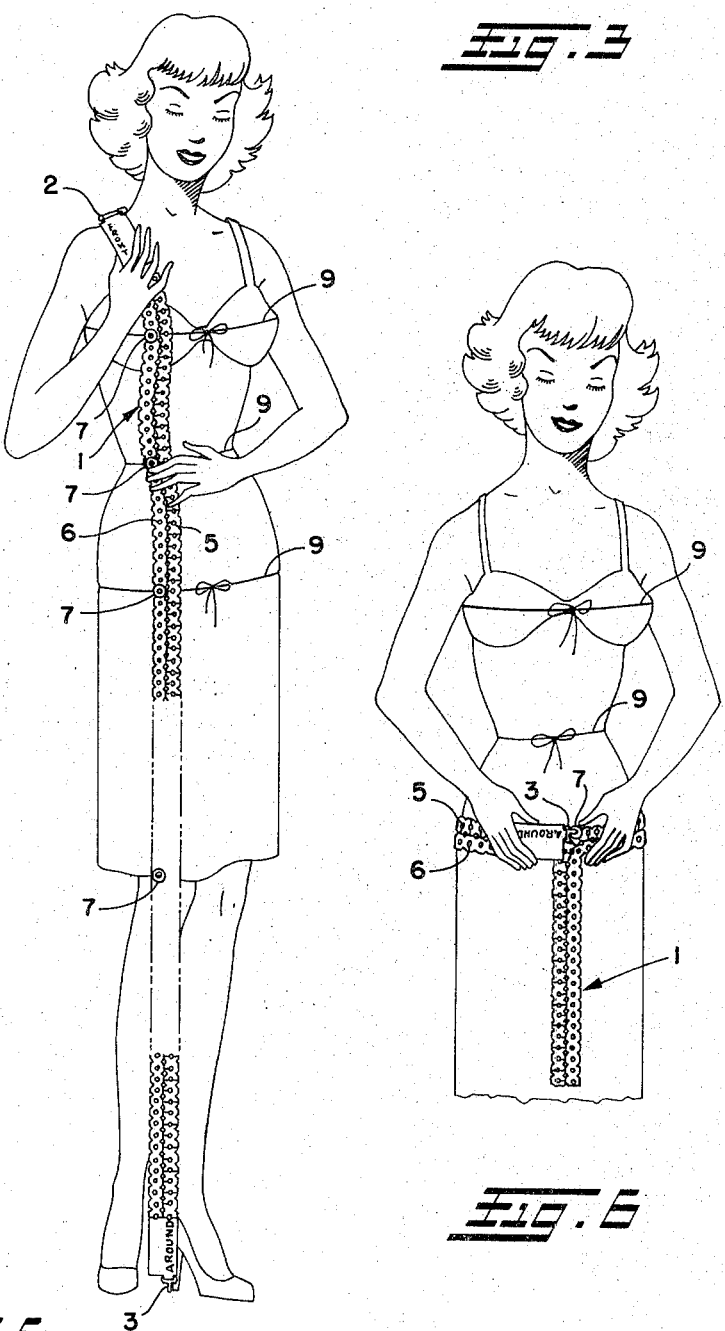
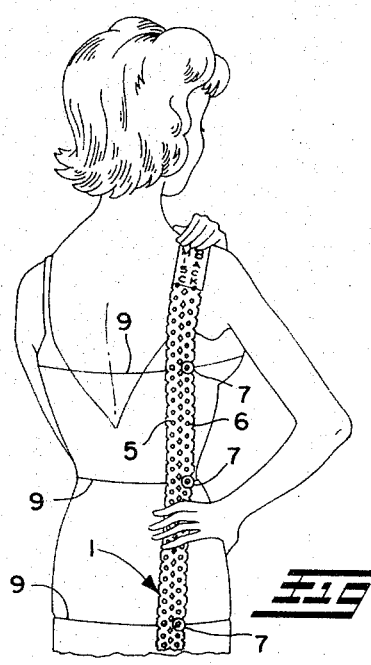

TAPE MEASURE

BACKGROUND OF THE INVENTION

The most prevalent practice in the making of garments, other than in a clothing factory, is to purchase a set of patterns according to style and size and to attach the patterns to the selected fabric, the pattern or fabric dimensions being modified to suit individual body measurements by use of an ordinary tape measure and transferring specific measurements to the pattern or fabric one by one or recording such measurements on a separate list for later pattern or fabric modifications.

It is, of course, known in the professional tailoring and dressmaking arts to provide a form which conforms to a particular customer's body measurements or to make up from a multitude of tapes a customer's body harness or to provide computerized personal patterns and basic patterns but, in the case of conventional tape measure measurements, forms, computerized patterns, and harnesses, these are expensive, complex, and/or time-consuming procedures.

SUMMARY OF THE INVENTION

In contradistinction to known garment making techniques, the present invention enables the taking and recording of body measurements rapidly and accurately for making of a garment which will be a correct fit on the measured person even in the case of a novice sewer.

It is a principal object of this invention to provide a body measurement recording device which is in the form of a flexible tape measure having detachably secured on opposite sides thereof identification markers, said markers being spaced various distances from one end of the tape measure which has pin means adapted to be secured at the middle of the shoulder as on an outer garment or on a brassiere or slip strap, the tape measure, when supported to suspend on the front side of the body, having front markers secured thereto on one side at points corresponding to the front bust, waist, hip, etc. lines and, when the tape measure is flipped over the back about said pin means, back markers may be secured to the other side of the tape measure at points corresponding to the back bust, waist, hip, etc. lines, said tape measure having hook means at the other end thereof which cooperate with longitudinally spaced apart apertures in the tape measure for making of circumferential measurements of the bust, the waist, the hips, etc. and securing to the tape measure corresponding markers.

It is another object of this invention to provide a method of making and recording body measurements such as the distances from the middle of the shoulder down the front and back to the respective bust, waist, and hip lines for example, by using temporary ties around said lines and securing to a tape measure suspended from the middle of the shoulder identification markers aligned with the respective temporary ties at both the front and back.

Other objects and advantages will appear from the ensuing description.

BRIEF DESCRIPTION OF THE DRAWING

FIG. 1 is a front elevation view of a preferred form of tape measure according to the present invention;

FIG. 2 is an edge elevation view as viewed from the right hand side of FIG. 1;

FIG. 3 is an elevation view of a card having identification markers adhered thereto as by pressure sensitive adhesive on said markers;

FIG. 4 is a front perspective view showing the tape measure herein pinned to the shoulder strap of a brassiere with bust front, waist front, and hip front markers detachably secured to one side of the tape measure in alignment with temporary string or ribbon ties at the bust, waist, and hip lines;

FIG. 5 is a fragmentary rear perspective view showing the tape measure flipped back over the shoulder with the bust back, waist back, and hip back markers detachably secured to the other side of the tape measure in alignment with the bust, waist, and hip temporary ties; and FIG. 6 is a fragmentary front perspective view showing the tape measure herein in use in measuring the circumference of the hips with the hook at one end of the tape measure hooked into an aperture in the tape measure and with the hip around marker detachably secured to the tape measure.

DETAILED DESCRIPTION OF THE PREFERRED EMBODIMENT

As best shown in FIGS. 1 and 2, the tape measure 1 herein comprises a strip of flexible material such as plastic coated fabric which has secured at its opposite ends a pin means 2 in the form of a safety pin and a hook means 3 in the form of a hook member, the safety pin 2 and hook member 3 being secured at the ends of the tape measure as by folded over tabs 4 which are permanently secured by sewing, adhesive, or heat sealing, for example.

The portion of the tape measure 1 adjacent the safety pin 2 is imprinted with the word "FRONT" and the portion of the tape measure adjacent the hook member 3 is imprinted with the word "AROUND" and, as evident from FIG. 5, the rear side of the tape measure 1 is imprinted with the words "BACK" and "MISC." (or "MISCELLANEOUS") adjacent the safety pin 2. Between the ends of the tape measure 1 are two series 5 and 6 of longitudinally spaced apart apertures which for convenience are spaced apart one half inch and one series 5 of apertures is provided with suitable numerical indicia (inches, and centimeters, for example).

For the purpose of indicating body measurements and for recording the same on the tape measure, there are provided a multiplicity of identifying markers 7 bearing identification such as shown in FIG. 3, said markers 7 preferably being in the form of transparent plastic rings having central openings adapted to be registered with the selected apertures of the series 5 and 6 and having pressure sensitive adhesive or the like on their rear sides to adhere them to the plastic card 8 for removal therefrom for detachable engagement with the tape measure 1 as hereinafter described. The markers 7 may be of different colors to distinguish front, back and around measurements or to distinguish bust, waist, hip, etc. measurements.

In the use of the tape measure 1 for denoting various body measurements and for recording the same on the tape measure 1 for the making of a garment such as a dress, the person for whom the dress is being made will have temporary ties 9, such as strings, ribbons, or elastic strips, around the bust, waist, and hips as shown in FIG. 4. For making the front measurements of the bust line, the waist line and the hip line, the pin means 2 may be secured as on a shoulder strap of a brassiere or slip at the middle of the shoulder and when the tape measure 1 is suspended on the front of the person as in FIG. 4, the BUST FRONT, WAIST FRONT, HIP FRONT, and HEM FRONT markers 7 may be adhered on the tape measure 1 in alignment with the apertures of the series 6 nearest the respective temporary ties 9 and nearest the desired hem line. When that has been done, the tape measure 1 may be flipped over the back about the safety pin 2 as shown in FIG. 5 and the BUST BACK, WAIST BACK, and HIP BACK markers 7 may be adhered on the rear side of the tape measure 1 in alignment with the apertures of series 6 nearest the ties 9. It is to be understood that other markers 7 may be attached elsewhere on the front or rear of the tape measure 1 to denote and record other dimensions of the person's body. In the case of a person having one shoulder lower than the other or a longer waistline on one side appropriate markers 7 may be secured at the respective apertures of series 5 on the side of the tape measure 1 marked "MISC."

For the purpose of indicating and recording circumferential measurements around the bust, the waist, the hips, the thighs, etc. the tape measure 1 is wrapped around the body and the hook member 3 is hooked into the nearest aperture of series 5. In FIG. 6, for example, the hip circumference is being measured with the hook member 3 engaged in the appropriate aperture of series 5 and the identification markers 7 HIP AROUND is adhered to the tape measure 1 in the corresponding aperture of series 5. Markers 7 labeled BUST AROUND and WAIST AROUND are similarly detachably secured to the tape measure 1 when the tape measure 1 is similarly hooked around the bust line and waist line respectively.

As evident, when garments such as pants are to be made, appropriate measurements may be taken around the thigh and elsewhere with the appropriate marker such as THIGH AROUND applied on the tape measure 1 and, if desired, the safety pin 2 in that case may be attached to what is to be the top of the waist of the pants with markers to indicate the length from the waist down.

Assuming now that the tape measure 1 has all of the appropriate identifying markers 7 detachably secured thereto, it is now a simple and rapid procedure to transfer these measurements to the patterns or to the pieces of fabric whereby, when the garment is made, it will be a correct fit on the measured person. In the case of a housewife making her own dresses, the tape measure 1 with the identifying markers 7 thereon may be used on other dresses so long as her size remains the same and, of course, if there is a loss or gain in weight, the markers 7 may be shifted to new positions. Likewise, a professional dressmaker or tailor may file the tape measures 1 with the identifying markers 7 thereon in the respective customers' files so as not to require remeasuring each time that a new garment is to be made.

The present invention simplifies and speeds up the making and recording body measurements so that even a novice may obtain professional fitting results with little effort. Moreover, the present invention is of great help to the experienced sewer in that it speeds up the making and recording of accurate body measurements.

The embodiments of the invention in which an exclusive property or privilege is claimed are defined as follows:

1. A tape measure comprising an elongated flexible strip having two side by side series of longitudinally spaced apart apertures between its ends; pin means at one end of said strip from which said strip is adapted to be suspended from the shoulder at the front and back of a person being measured for tailoring of a garment; hook means at the other end of said strip for hooking into selected apertures of one series of apertures when making circumferential measurements of such person; front and back identification markers detachably secured to the respective front and back sides of said strip in alignment with selected apertures of the other series of apertures to denote and record such front and back measurements; and circumference identification markers detachably secured to one side of said strip in alignment with the selected apertures of said one series of apertures.

2. The tape measure of claim 1 wherein said pin means comprises a safety pin adapted to be pinned on an undergarment at the middle of the shoulder for flipping of the suspended strip from the front to the back or vice versa when applying said front and back markers on the respective front and back sides of said strip denoting distances from the shoulder as to the bust, waist, and hip lines.

3. A tape measure comprising an elongated flexible strip having a series of longitudinally spaced apart apertures between its ends; pin means at one end of said strip from which said strip is adapted to be suspended from the shoulder at the front and back of a person being measured for tailoring of a garment; hook means at the other end of said strip for hooking into selected apertures when making circumferential measurements of such person; and identification markers detachably secured to said strip to denote and record such front and back and circumferential measurements; said strip having another series of longitudinally spaced apart apertures parallel to said first mentioned series of apertures for application of identification markers on opposite sides of said strip in alignment with the successive apertures corresponding to the front and back measurements from the shoulder.

4. The tape measure of claim 3 wherein said markers have pressure sensitive adhesive on one side thereof for detachably securing them to said strip.

5. The tape measure of claim 3 wherein said markers comprise rings adapted to be secured on opposite sides of said strip in coaxial relation with the respective apertures of said another series of apertures.

* * * * *